United States Patent [19]

Trense et al.

[11] 4,053,396

[45] Oct. 11, 1977

[54] CONTROL OF AEROBIC BIOLOGICAL GROWTH IN ACTIVATED CARBON WASTE WATER TREATMENT

[75] Inventors: Ronald V. Trense, Metuchen; Allen Clamen, Westfield; John M. Fernbacher, Madison, all of N.J.

[73] Assignee: Exxon Research & Engineering Co., Linden, N.J.

[21] Appl. No.: 542,588

[22] Filed: Jan. 20, 1975

Related U.S. Application Data

[63] Continuation-in-part of Ser. No. 454,278, March 25, 1974, abandoned, which is a continuation of Ser. No. 267,231, June 28, 1972, abandoned.

[51] Int. Cl.² ............................ C02C 1/04; C02C 5/04
[52] U.S. Cl. ........................................ 210/17; 210/20; 210/32; 210/40
[58] Field of Search ............... 210/15, 17, 18, 20, 210/26–28, 32, 39, 40, 48, 52, 53; 252/421

[56] References Cited

U.S. PATENT DOCUMENTS

| 3,142,638 | 7/1964 | Blaisdell et al. | 210/52 |
| 3,232,434 | 2/1966 | Albersmeyer et al. | 210/17 |
| 3,322,550 | 5/1967 | Murphy | 252/421 |
| 3,455,820 | 7/1969 | Joyce et al. | 210/40 |
| 3,547,816 | 12/1970 | Horiguchi et al. | 210/15 |
| 3,803,029 | 4/1974 | Blecharczyk | 210/16 |
| 3,840,476 | 10/1974 | Metrailer | 252/421 |
| 3,855,120 | 12/1974 | Garbo | 210/17 |
| 3,904,518 | 9/1975 | Hutton et al. | 210/17 |
| 4,009,098 | 2/1977 | Jeris | 210/17 |
| 4,009,099 | 2/1977 | Jeris | 210/17 |

OTHER PUBLICATIONS

Weber et al., "Physiochemical Treatment of Wastewater," J.W.P.C.F., vol. 42, Jan., 1970, pp. 83–99.

Primary Examiner—Thomas G. Wyse
Attorney, Agent, or Firm—John W. Ditsler

[57] ABSTRACT

Organic contaminants are removed from waste water streams by initially pretreating the stream to remove suspended solids and oil therefrom and thereafter passing the pretreated waste water through bed(s) of activated carbon while adding a controlled amount of oxygen to the bed(s) in an amount ranging from about 0.05 to about 0.15 pound of oxygen consumed per pound of total COD contaminants removed from the waste water by this process. By following the method of the present invention, the balance between the aerobic/anaerobic biological oxidation of the contaminants adsorbed on the activated carbon may be controlled so as to suppress the evolution of hydrogen sulfide from the bed while minimizing the formation of aerobic biological sludge which would plug the bed(s). This controlled biological activity that occurs in the carbon adsorption system provides for a substantial increase in the effective organic contaminant removal capacity of the activated carbon. It is preferred that the oxygen is dissolved in the waste water stream prior to contact with the bed(s) of activated carbon.

27 Claims, 2 Drawing Figures

CONTROL OF AEROBIC BIOLOGICAL GROWTH IN ACTIVATED CARBON WASTE WATER TREATMENT

CROSS-REFERENCE TO RELATED CASES

This is a continuation-in-part of application Ser. No. 454,278, filed Mar. 25, 1974 which in turn is a continuation of application Ser. No. 267,231, filed June 28, 1972, both applications now abandoned.

BACKGROUND OF THE INVENTION

1. Field of the Invention

This invention relates to removing organic contaminants from waste water streams. More particularly, this invention relates to pretreating a waste water stream to remove suspended inorganic solids and suspended organic contaminants generally described as oil and, thereafter, passing the pretreated waste water through the bed(s) of activated carbon. In particular, this invention relates to an improved process for employing activated carbon treatment of pretreated waste water streams by adding a controlled amount of oxygen to the activated carbon bed(s) in the range of from about 0.05 to about 0.15 pound of oxygen consumed per pound of total COD contaminants removed from the waste water. Preferably, the oxygen is dissolved in the waste water prior to contacting the bed(s) of activated carbon. The addition of this critical amount of oxygen consumed within the activated carbon bed(s) provides a balance between anaerobic and aerobic biological degradation of the contaminants adsorbed on the activated carbon so as to suppress the evolution of hydrogen sulfide from the bed(s) while at the same time minimizing the formation of aerobic sludge produced by the biological oxidation occurring in the bed(s). The biological activity in the activated carbon bed(s) provides for a substantial increase in the effective organic contaminant removal capacity of the activated carbon.

2. DESCRIPTION OF THE PRIOR ART

The most common method employed for removing impurities from waste water comprises a primary settling step wherein a major portion of the solids suspended therein is removed with or without the aid of chemical flocculating agents. A secondary treat step may then be performed to decompose by bacteriological action the remaining suspended solids which are usually present in a concentration ranging from about 50 to about 150 ppm. In addition, the secondary treating step generally employs vigorous aeration in order to further decompose the dissolved organic materials by bacterial action. The effluent from this secondary biological treating step is settled to remove the bacteria as a sludge, at least a portion of which is then recycled to the secondary treating zone. The clarified effluent is passed into rivers or streams, generally with no further purification.

This method of biologically treating waste water was developed primarily for the treatment of sanitary or household sewerage, which is typically found in a municipal sewer, and has generally worked quite satisfactorily. Recently, however, industrial plants have been discharging waste waters in municipal sewer systems. This has resulted in serious difficulties since industrial waste waters also contain a significant amount of nonbiodegradable pollutants and toxic materials. These nonbiodegradable pollutants are not removed from the industrial waste waters and the toxic materials therein often destroy the bacteria in the secondary biological treatment step, thereby rendering the treatment plant inoperable for a period of time while the toxic materials are purged from the system and new bacterial growth reestablished. In addition, conventional biological oxidation has not demonstrated the ability to produce consistently high quality effluent when treating waste waters from petroleum refining and petrochemical manufacturing operations.

In determining the degree of contamination of a waste water stream, certain recognized measures have been developed. They include: Biochemical Oxygen Demand (BOD), which is the quantity of oxygen in milligrams per liter or parts per million utilized in the biochemical oxidation of the organic matter contained in the water within a period of 5 days at 20° C. and often designated as $BOD_5$; and Chemical Oxygen Demand (COD), which is the quantity of oxygen expressed in milligrams per liter or parts per million consumed under specific oxidation conditions with strong chemical oxidizing agents, such as sodium chromate (see *Standard Methods for the Examination of Water and Waste Water*, 12th Edition, Public Health Association, New York, N.Y., (1965), pp. 510–514, which is incorporated herein by reference). Generally, the acceptable minimal standard expressed in terms of $BOD_5$ and COD for a purified waste water stream is about 20 and about 100 milligrams per liter, respectively.

Recent standards being promulgated for pollution abatement are generally stated in terms emphasizing COD rather than BOD. Municipal sewerage generally has a $BOD_5$ prior to entry into the primary settler discussed above ranging from about 100 to about 150 milligrams per liter. Municipalities which have a significant amount of industrial waste water discharged into their sewerage system may have a $BOD_5$ within the range of 200 to 400 milligrams per liter or higher. After the municipal sewerage has been treated in the primary settling step, the $BOD_5$ will be in the range from about 50 to about 100 milligrams per liter or higher if a substantial amount of industrial waste is contained in the municipal sewerage. The COD will generally be considerably higher than the $BOD_5$ depending upon the amount of nonbiodegradable material in the sewerage. For example, if the municipal sewerage contains primarily sanitary sewerage, the COD will be only slightly higher than the $BOD_5$. However, with a substantial quantity of effluents from industrial plants contained in the sewerage, the COD may be two to three times as high as the $BOD_5$, both before and after the sewerage has been passed through the primary settling step. After the secondary biological treatment, the $BOD_5$ as well as the COD from the purely sanitary sewerage, will be normally in the range of from about 20 to about 35 milligrams per liter. However, in the event a substantial amount of industrial waste is included in the municipal sewerage, the effluent from the secondary biological treatment can exhibit a COD of 100 milligrams per liter or higher.

Accordingly, it can be seen that the removal of nonbiodegradable impurities from industrial waste waters requires treatment additional to that necessary for normal sanitary sewerage. This is due primarily to the industrial waste waters containing a much higher concentration of nonbiodegradable impurities than is present in normal sanitary sewerage. For example, the COD of such industrial waste waters can range from about 100 to 2000 milligrams per liter and in some cases as high as 5000 to 6000 milligrams per liter. Since large amounts of nonbiodegradable organic compounds are present in the industrial waste waters after the biological secondary treatment, the effluent from said treatment may still have a COD as high as 600 to 1000 milligrams per liter. Furthermore, industrial waste waters usually have a high concentration of toxic materials such that biological treatment, even under the best of conditions, is generally unreliable and subject to frequent destruction of the biological organism. Hence, the effluents passed to receiving waters from such treatment can approach the COD of the raw waste waters. This is particularly true with regard to bio-resistant contaminants such as aromatics, halogenated hydrocarbons, nitrated hydrocarbons, and tertiary alcohols, which are characteristic of petroleum refining and organic chemical manufacturing waste waters. Although these organic contaminants may be nonbiodegradable and thus not considered to deplete the oxygen content of the receiving waters, they may biodegrade over a period greater than the five days measured by the BOD test and thus deplete oxygen in larger rivers and lakes. Furthermore, these bio-resistant contaminants may be noxius since such contaminants affect the taste, odor and color of the receiving waters and exhibit toxic effects on the fish and plant life therein. Thus, even when the biolgical treatment plants are operating under optimum conditions, the amount of organic contaminants removed may not be sufficient to meet the standards presently being established. As a consequence, there is a need for further treating of the effluents from such biological secondary treatment plants, as well as a need for an improved process for treating industrial waste waters, in order to remove both biodegradable and nonbiodegradable organic contaminants therefrom so as to prevent the undersirable results mentioned above.

In order to remove the organic contaminants from waste waters, particularly industrial waste waters, it has been proposed to treat the waste waters as well as the effluent from the secondary biological treatment step with activated carbon. For example, U.S. Pat. Nos. 3,244,621, 3,455,820 and 3,658,697 disclose methods for removing organic soluble impurities from waste water by passing said waste water through a bed of activated carbon. However, it has also been disclosed (see Hopkins, C. B., Weber, W. J., Jr., Bloom, R., Jr., U.S. Department of interior Federal Water Pollution Control Administration Report No. TWRC-2, Dec. 1968) that during the prolonged treatment of municipal and industrial waste waters with granular activated carbon, there occurs a significant buildup of sludge in the carbon bed(s) due to biological activity in the beds. The production of this biological sludge, in addition to presenting a sludge removal and disposal problem, results in plugging of the carbon beds, thereby requiring frequent backwashing in order to obtain satisfactory hydraulic operation of the beds. In addition, anaerobic biological activity occurring in the activated carbon bed also results in the undesirable generation of hydrogen sulfide which is discharged from the carbon bed (see U.S. Pat. No. 3,658,697).

Methods of employing activated carbon to remove contaminants from waste water have often met with limited commercial success due to either the limited adsorption capability or the high cost of the adsorbents. For example, when delayed coke is employed as the adsorbent, only suspended oils and phenolic compounds are removed from the waste water stream. The use of activated carbon has been severely inhibited by associated processing difficulties and the inherent high initial cost of the material. In addition, the high attrition and regeneration losses which occur when activated carbon is employed in the prior art processes mentioned above result in high make-up costs. Activated carbons in powdered form, although available at relatively low initial cost since they are produced largely by the partial incineration of waste liquid from paper manufacture, are difficult to remove from the treated water because of their highly subdivided state which results in very low settling rates. Thus, when using powdered activated carbon, each contact stage requires a subsequent settling stage having a long residence time and the use of expensive organic polymers as flocculents. Furthermore, after removal from the water, no practical techniques have been developed for regenerating activated powdered carbon for reuse. Thus, even if the initial unit cost of the powdered activated carbon is relatively low, the overall operating cost becomes exorbitant since the material can be used only once and then must be disposed of at an additional cost.

Granular activated carbons, such as those produced from coal, are expensive adsorbents because they require a multi-step process for their manufacture in order to produce them with uniform particle size and acceptable hardness. Even though these materials have greater hardness and attrition resistance than the so-called "soft" activated carbons produced from other materials such as wood, nut shells, and the like, the attrition resistance from granular activated carbon still leaves much to be desired. Specifically, a significant portion of the granular activated carbon is lost due to attrition in the handling and use of the material. This may occur, for example, when the granular activated carbon is removed from the waste water contacting bed(s) and regenerated in a device such as a multiple-hearth furnace, the regenerated granular activated carbon then being recycled to the contacting bed(s). Not only does this represent a high operating cost due to the make-up with fresh granular activated carbon material, but the fines produced by said attrition are difficult to remove from the treated water and, therefore, represent a source of contamination.

Accordingly, since activated carbon is a comparatively expensive material for use in removing contaminants from waste water streams, there is a need for a method of increasing the contaminant removal capacity of the activated carbon material.

SUMMARY OF THE INVENTION

It has now been unexpectedly discovered that in a waste water treatment process wherein the waste water is initially pretreated to remove suspended solids and oil therefrom prior to passage through one or more beds of activated carbon, that the addition of a critical amount of oxygen in the range of from about 0.05 to about 0.15 pound of oxygen consumed per pound of total COD contaminants removed from said waste water results in controlled aerobic biological oxidation of the contaminants adsorbed on the activated carbon. When the amount of oxygen added to and consumed in the activated carbon bed is maintained within the above-mentioned limits, the evolution of hydrogen sulfide, which occurs as a result of uncontrolled anaerobic biological growth on the carbon in the bed, is suppressed. Further, the amount of sludge which is formed inherently during the aerobic biological oxidation in the bed is minimized so as to prevent plugging of the contacting system, i.e., the bed(s) of activated carbon. In addition, the controlled aerobic oxidation obtained by the practice of the instant invention results in a substantial increase in the effective organic contaminant removal capacity of the activated carbon relative to that achieved by physical adsorption alone.

It has also been discovered that control of the critical amount of oxygen is dependent upon the method of adding the oxygen to the activated carbon bed(s). More specifically, it has been found that the oxygen is preferably dissolved in the waste water prior to contacting the activated carbon bed(s). For example, in one embodiment of the present invention, oxygen is dissolved in the waste water stream prior to entering at least one bed of activated carbon. In this particular embodiment, it is not critical where the oxygen is added to the waste water so long as it is for a period of time sufficient for the oxygen to be dissolved therein. However, in another and more preferred embodiment of the present invention, a portion of oxygen is dissolved in the waste water in a presaturation zone such that the waste water is substantially saturated prior to contacting at least one, preferably the first, bed of activated carbon, while the remaining portion of the oxygen is introduced into the freeboard of at least one activated carbon bed, i.e. the unoccupied portion above said bed of activated carbon. The means for dissolving the oxygen in the waste water is not critical and would be obvious to one skilled in the art of gas/liquid contacting.

In another embodiment of this invention, it has been discovered that activated clay is a preferred coagulant in the pretreatment of the waste water to remove suspended oil and solids remaining after gravity settling, because said clay prevents fouling of the activated carbon bed which may occur when using soluble inorganic coagulants. In still another embodiment of the instant invention, it has been further discovered that passing the waste water upwardly through an unconfined bed of activated carbon is preferred to the conventional downflow contacting of the waste water with the activated carbon because the upflow expanded-bed technique requires less backwashing and maintains a constant pressure drop across the bed.

DETAILED DESCRIPTION OF THE INVENTION

The waste water which is treated by the process of the instant invention is first treated for removal of suspended matter prior to contact with the activated carbon in the carbon contacting columns or bed(s). The waste waters which can be purified by the process of the instant invention include sanitary, municipal or industrial waste water streams which contain dissolved organic contaminants such as aliphatic, aromatic and phenolic hydrocarbons. The process of this invention is particularly applicable to removing bioresistant contaminants such as aromatics, halogenated and nitrated hydrocarbons and the like, which are characteristic of petroleum refining and organic chemical manufacturing waste waters. In general these bio-resistant contaminants contribute very objectionable taste and odor to the receiving waters and are essentially completely removed by the activated carbon adsorption process of the instant invention while remaining essentially unaffected by conventional biological treatment. Although the raw waste water stream is normally pretreated in order to remove suspended solids and oils therefrom, the bed of activated carbon effectively filters the remaining suspended solids and removes dissolved organic materials by physical adsorption and concurrent biological degradation of the contaminants on the activated carbon.

As mentioned above, the raw waste water containing the organic contaminants is initially passed through a primary treating zone wherein the waste water is clarified by settling. Coagulating polymers may be employed in this settling step to increase the overall removal of the suspended solids and oils. Normally, the raw waste water being purified from, for example, a petroleum refinery contains appreciable amounts of oil and other suspended solids. These suspended oil droplets and solids may be advantageously removed in the primary settling zone with the aid of coagulants. In addition to the use of both organic and inorganic coagulants, which are known in the art to be suitable for increasing the overall removal of the suspended solids and oil, additional techniques such as dissolved air flotation, solids-contact clarification and granular media (dual-media or multi-media) filtration techniques may also be usefully employed in order to separate the suspended solids and oil from the raw waste water. While any of these techniques may be employed in the practice of the instant invention, granular media filtration being preferred, it has been found that if a coagulant is necessary, activated clay is particularly effective. The use of soluble inorganic coagulants such as alum with a polyelectrolyte in combination with dissolved air flotation often leads, over a period of time, to fouling of the activated carbon bed. This is believed due to the dissolved aluminum compounds which remain in the effluent forming a precipitate on the activated carbon, thereby causing serious plugging problems when the waste water is passed either upflow or downflow through the activated carbon bed. This also substantially reduces the ability of the activated carbon to remove organic contaminants from waste water after thermal regeneration. Accordingly, the activated clay which has been found to be unexpectedly suitable as a coagulant for the initial primary treatment of the raw waste water, comprises a sodium montmorillonite clay in combination with an organic cationic agent such as an amine or glycol, and has the advantage of preventing the heretofore-mentioned plugging problems as well as permanent carbon deactivation. The sodium montmorillonite clay can be activated with a number of cationic agents including primary, secondary and tertiary amines as well as the so-called ethylene amines such as tetraethylene pentamine. The activated clay coagulants which are suitable for use in this treatment process include all of those clays specifically disclosed in U.S. Pat. No. 3,487,928, the disclosure of which is hereby incorporated by reference. Preferably, a flocculating-coagulating solution consisting of sodium montmorillonite clay in combination with a cationic activating agent is added to the waste water in an amount in the range of from about 10 to 50 parts per million clay in combination with 1 to 5 parts per million of the activating agent in order to promote the settling of suspended oils and solids in the primary treating zone.

The pretreated waste water is then passed through one or more beds of activated carbon. It is an essential feature of the instant invention that oxygen is added to, i.e., contacted with, and consumed in the bed(s) of activated carbon in an amount sufficient to control the aerobic/anaerobic biological degradation of the contaminants adsorbed on said activated carbon so as to suppress the evolution of hydrogen sulfide from the carbon bed. However, oxygen should not be added in an amount sufficient to promote excessive sludge formation of the aerobic biological sludge on the activated carbon so as to plug the bed(s). In general, the amount of oxygen which is added to the bed(s) of activated carbon ranges from about 0.05 to about 0.15 pound of oxygen consumed per pound of total COD contaminants removed from the waste water. Further, by using the preferred method, the amount of oxygen required may be reduced to less than 0.05, for example to a level of 0.03 or as low as 0.01 pound of oxygen consumed per pound of total COD contaminants removed from the waste water. The lower level of oxygen required is due to dissolving oxygen prior to contacting the first bed of activated carbon wherein the biological activity is most pronounced. The presence of oxygen in the first bed suppresses the evolution of hydrogen sulfide which, if formed, would increase the level of COD and release a noxious odor. In addition, by employing the method of the present invention, the presence of free gas bubbles in the waste water which is associated with direct addition of oxygen to the activated carbon bed(s), is essentially eliminated thereby substantially eliminating agitation of said bed(s). Thus when the amount of oxygen consumed within the bed(s) is maintained within the critical range set forth above for either embodiment of the present invention, the combination of aerobic and anaerobic biological degradation of the contaminants adsorbed on the activated carbon results in a substantial increase in contaminant removal capacity of the carbon relative to straight physical adsorption. In addition, when the amount of oxygen which is added to and consumed in the carbon bed is maintained within said critical range, the evolution of hydrogen sulfide from the bed is suppressed. Further, adding this critical amount of oxygen to the bed(s) of activated carbon not only suppresses the formation of hydrogen sulfide and thus alleviates a serious pollution problem, but prevents excessive sludge formation in the activated carbon bed which would render inefficient the activated carbon treatment process of the instant invention.

It has further been discovered that for either embodiment, the critical amount of oxygen which must be added and consumed in order to control the aerobic biological oxidation of the contaminants adsorbed on the activated carbon while at the same time suppressing the evolution of hydrogen sulfide from the bed and the formation of excess amounts of aerobic sludge, is affected by the particular backwashing technique employed. Backwashing is required whenever the solids buildup causes either an increase in the pressure drop when the waste water is passed downflow through the bed of activated carbon or whenever there occurs an excessive bed expansion when waste water is passed upflow through the bed of activated carbon. Backwashing is accomplished by pumping either the pretreated effluent or carbon treated effluent from the waste water treatment process at a rate of from about 10 to about 20 gallons per minute per square foot up through the activated carbon bed. In general, when this procedure is interrupted intermittently in order to pass a gaseous stream such as air through the activated carbon bed to "air scour" the activated carbon, the critical amount of oxygen which must be added to the activated carbon bed(s) to achieve the results mentioned above may be reduced. It is believed that any reduction in the amount of oxygen that must be dissolved therein per pound of total COD contaminants removed from the waste water is due to the air scouring effectively reducing the thickness of the biological sludge layer on the activated carbon granules. This in turn is believed to reduce the oxygen required to maintain an aerobic-anaerobic balance in the carbon bed(s). Further, this reduction in the oxygen requirement could also be due to oxygen being adsorbed by the activated carbon during the air scouring step.

The introduction of the critical amounts of oxygen into the activated carbon bed(s) of either embodiment may be accomplished by either adding air, a gaseous stream containing oxygen, or oxygen in an amount sufficient to control the aerobic biological oxidation of the contaminants adsorbed on the carbon, thereby suppressing the evolution of hydrogen sulfide from the bed(s) of activated carbon and minimizing the aerobic biological sludge which necessarily is formed due to the addition of oxygen to the bed(s). Further, the addition of this controlled amount of oxygen results in not only a combination of aerobic and anaerobic biological activity occurring in the carbon bed(s), but in a substantial increase in the contaminant removal capacity of the carbon. For example, the activated carbon capacity obtained by employing the practice of this invention ranged up to about three times that which could be obtained by conventional physical adsorption.

Many different types of activated carbon may be employed in the practice of this invention. The activated carbon should have a high surface area, preferably in the range of from about 300 to about 1200, and more preferably in the range of from about 400 to about 1000 square meters per gram. It is preferred to pass the waste water upwardly, i.e., upflow, through the bed of activated carbon because this technique requires less backwashing of the activated carbon while maintaining a constant pressure drop across the activated carbon bed. Also, it is preferred that the activated carbon being employed have a high attrition resistance in order to prevent excessive fines from being formed in the expanded bed upflow mode of operation. In addition, it is preferred that activated carbons which adhere to gas bubbles formed in the expanded activated carbon bed during the upflow mode technique be avoided since such carbons are removed from the activated carbon bed-contacting zone.

Other activated carbons which can be employed in the practice of the instant invention are activated fluid coke compositions as disclosed in copending U.S. application Ser. No. 542,587, filed Jan. 20, 1975 the disclosures of which are incorporated herein by reference. These activated fluid coke compositions are characterized by having a total surface area of at least 400 square meters per gram and a pore volume of at least 0.20 cubic centimeters per gram. The activated fluid coke is prepared by contacting petroleum fluid coke with a gaseous mixture containing steam at a temperature of at least 1500° F. for a period of time sufficient to convert at least 35 weight % of the coke particles to gaseous products, thereby forming an activated coke composition which exhibits superior properties as an adsorbent.

The process of the present invention will be further described with reference to the accompanying drawings which show two embodiments thereof. It is to be understood that the drawings are shown only in such details as are necessary for a clear understanding of the invention and that no intention is made thereby to unduly limit the scope of this invention. Various items such as valves, compressors, instrumentation, as well as other process equipment and control means have been omitted therefrom for the sake of simplicity. Variations obvious to those having ordinary skill in the art of waste water treatment processes are included within the broad scope of the present invention.

Figure 1:
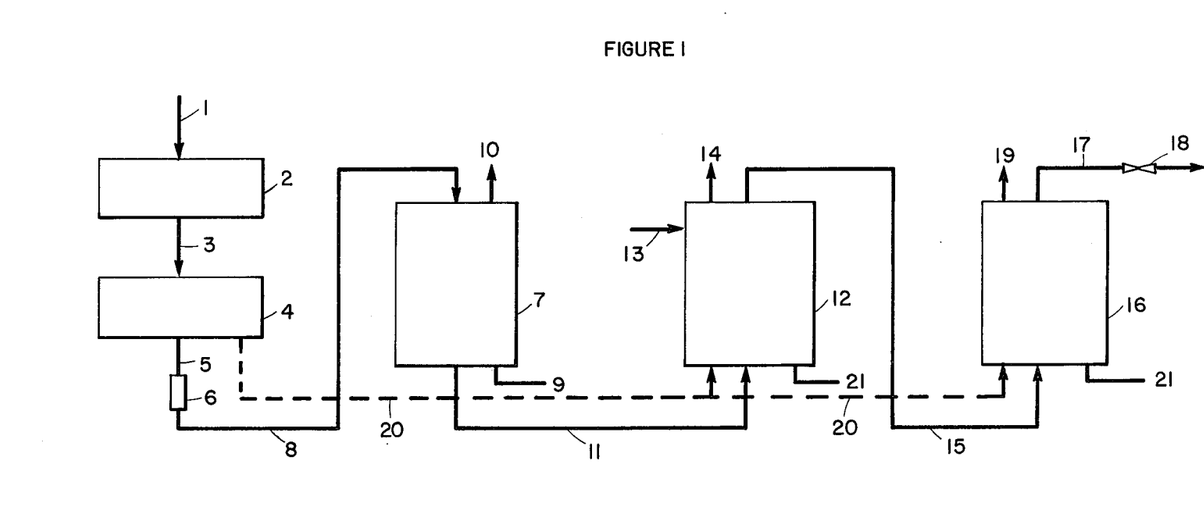
FIG. 1 shows a schematic flow diagram of the preferred embodiment of the present invention wherein the waste water is substantially saturated in a presaturation zone with an oxygen-containing gas prior to contacting the first activated carbon bed, a portion of said gas also being introduced into the freeboard of at least one activated carbon bed.

Referring now to FIG. 1, raw industrial sewerage having a COD contaminant level of about 800 milligrams per liter and containing adsorbable contaminants such as aromatic, aliphatic and phenolic hydrocarbons, etc., as well as suspended oil and solids, is passed by way of line 1 into the pretreatment zone 2. In the pretreatment zone 2, suspended materials, that is material which does not pass an 0.45 μ Millipore filter, is removed to a concentration of less than 25 weight parts per million, preferably less than 15 weight parts per million. The pretreatment processes which may be employed can vary over a wide range and include, but are not limited to, the following: dissolved air flotation, sedimentation, solids-contact clarification, and granular media filtration. The preferred pretreatment process for reducing suspended material to less than 15 weight parts per million comprises granular media filtration, for example dual-media filtration. Should a primary coagulant be needed, activated clay is preferred.

The pretreated waste water is thereafter passed via line 3 into a storage tank 4 in order to provide feed equilization for the carbon adsorption beds and backwash water for the dual-media filters and the carbon adsorption beds. Thereafter, the pretreated waste water is passed via line 5 through feed pump 6 into the upper portion of presaturation zone 7 via line 8. A portion of an oxygen-containing gas is introduced into the bottom of zone 7 via line 9, flows upward countercurrent to the downward flowing waste water and dissolves therein. Any undissolved oxygen is vented through line 10. The presaturation zone provides a means wherein oxygen can be dissolved in the waste water prior to contacting the activated carbon beds. Although not necessary to the practice of the present invention, the zone will preferably contain suitable means such as baffles, nozzles, agitators, or packing and the like, to promote intimate contact between waste water and the oxygen-containing gas. Suitable means to facilitate such contacting are well known in the art and beyond the scope of the present invention. Although countercurrent flow of waste water and gas is shown for the embodiment in FIG. 1, it may be suitably operated in cocurrent flow.

Waste water containing dissolved oxygen is then passed via line 11 into the bottom of the first activated carbon contacting zone 12 within which is maintained a bed of activated carbon. The waste water passed upwardly through the activated carbon zone causes an expansion of the activated carbon bed. The activated carbon bed has physical characteristics such that the bed expands in volume from about 5% to about 15% but not sufficient to cause fluidization of the entire bed at waste water flow rates between about 3 and about 7 gallons per minute per square foot of bed crosssectional area. The remaining portion of an oxygen-containing gas such as air, oxygen enriched air, or oxygen is introduced into the freeboard of contacting zone 12 via line 13 and passes upward while being dissolved in the waste water. In this particular embodiment it is important that the oxygen-containing gas be added to the freeboard to achieve the benefit of the present invention. Any undissolved oxygen-containing gas is vented through line 14. Partially treated effluent is discharged from the upper portion of contacting zone 12 via line 15 into the bottom of second activated carbon contacting zone 16 and passes upward through the activated carbon bed therein. Treated waste effluent is removed from contacting zone 16 via line 17 and passes through backpressure control valve 18. A vent line 19 is provided for the removal of gases released in zone 16. In the two stage embodiment shown in FIG. 1, it is not necessary to add oxygen to the freeboard of the second and last contacting zone since additional beds of activated carbon are not to be contacted. However, post aeration, if desired, may be accomplished in this manner by adding an oxygen-containing gas.

In the preferred embodiment, the amount of dissolved oxygen in the waste water flowing through lines 11 and 15 is critical, as previously described, and can be controlled by changing the flow rates of oxygen through lines 9 and 13 or by changing the system pressure by means of backpressure control valve 18. The pressure of the system is not critical provided it is sufficient to allow the necessary amount of oxygen to be dissolved in the waste water. For example, if air is the oxygen-containing gas, a higher pressure is required to dissolve the same amount of oxygen than if the gas were pure oxygen. Thus, in general, the pressure at the inlet of the first activated bed contacting zone is maintained in the range of from about atmospheric to about 150 psia, preferably between about atmospheric and about 100 psia.

Periodically the buildup of biological sludge on the activated carbon may result in excessive expansion of the activated carbon bed. A backwashing technique is employed in order to partially remove the sludge adhering to the carbon granules by passing from about 10 to about 20 gallons per square foot of pretreated effluent by way of dotted line 20 up through the contacting zones 12 and 16. It is preferred to interrupt intermittently the passage of this pretreated effluent by passing via line 21 upwardly through the activated carbon bed(s) a gaseous stream containing oxygen, such as air, in order to scour the activated carbon granules and reduce the thickness of the biological sludge layer which accumulates on the activated carbon. Normally, each carbon adsorption column is backwashed about every 2 days, with the period of time required for the backwashing being of from about ½ to about 1 hours' duration. Typically, the backwashing is interrupted approximately three of four times in order to air scour the activated carbon by passing air, preferably under pressure, for a period of from about 10 to about 30 seconds, upwardly through the carbon bed. As mentioned above, this air scouring technique may reduce the thickness of the biological sludge layer on the activated carbon granules, as well as the oxygen requirement which must be present in the bed in accordance with the practice of the instant invention.

Figure 2:
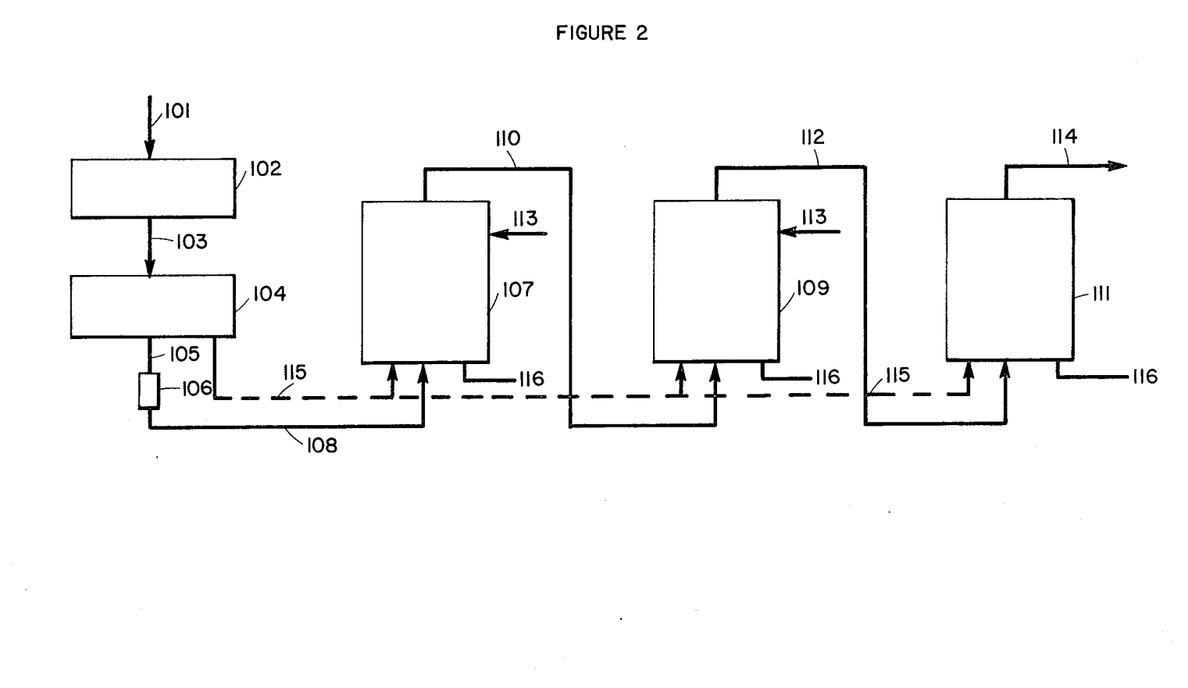
FIG. 2 shows a schematic flow diagram of an alternate embodiment of the present invention wherein an oxygencontaining gas is contacted with the waste water in the freeboard of at least one activated carbon bed.

An alternate and less preferred embodiment is shown in FIG. 2. Portions of FIG. 2, except for numerical differences, are very similar to and perform essentially the same functions as described in FIG. 1. Thus, this embodiment will be described more briefly. In FIG. 2, as described above, the waste water stream of the preferred embodiment is passed through line 101 into a pretreatment zone 102. The pretreated waste water is then passed via line 103 into storage tank 104. Thereafter, the pretreated waste water is passed via line 105 through feed pump 106 into the bottom of the first activated carbon contacting zone 107 via line 108. Within the activated carbon contacting zones 107, 109 and 111 there is maintained, as in FIG. 1, a bed of activated carbon which expands when the waste water is passed upwardly through said activated carbon contacting zone 107.

In this embodiment of the present invention, it is essential that the previously mentioned critical amounts of oxygen be dissolved in the waste water prior to contacting activated carbon contacting zones 109 and 111. This may be accomplished by various methods which include but are not limited to the following: injection of air, oxygen enriched air, or oxygen into line 108; injection of air, oxygen enriched air, or oxygen into the activated carbon contacting zone 107 and/or injection of air, oxygen enriched air, or oxygen into the freeboard above the activated carbon contacting zone 107. In the embodiment shown in FIG. 2, air, oxygen enriched air or oxygen is introduced by way of line 113 into the freeboard of each contacting zone except the last. Post aeration as mentioned above may be desired. In both of the activated carbon beds 109 and 111, the amount of oxygen added to each bed was maintained at a level sufficient to provide a balance between the aerobic/anaerobic biological oxidation occurring therein. The flow of industrial sewerage between staged contacting vessels may be accomplished either by using pumps or design of the contacting zones to permit gravity flow between stages. The selection of the economic number of carbon contacting stages is apparent to one skilled in the art of activated carbon waste water treatment. The backwashing and air scouring steps used in FIG. 1 may be similarly employed in this embodiment by using lines 115 and 116, respectively, in the manner described above.

This invention and the embodiments thereof will be further understood by reference to the following examples.

In the following Examples 1-5, refinery waste water having a COD contaminant level ranging from about 400 to 1500 milligrams per liter was passed through a dual-media, i.e., anthracite and sand, filter which removes suspended oils and solids resulting in a filtrate having a COD contaminant level ranging from 300 to 1400 milligrams per liter. This filtrate was continuously passed at a rate of 0.066 gallons per minute sequentially through 12 columns 2 inches in diameter and 6 feet in height, each column containing a loading of commercially activated granular carbon. The flow of the waste water was upflow through each vertical column, with the effluent from the top of each column being introduced into the bottom of the next column. At an average flow rate of 0.066 gallons per minute (or 3 gallons per minute per square foot), the bed of activated granular carbon expanded from about 5 to about 10% in height. Oxygen was introduced into the activated carbon bed by injecting the oxygen-containing gas stream at the top of the activated carbon bed in the second, fourth, sixth, eighth and tenth columns. Dissolved oxygen measurements were made of the water leaving each column and the total organic contaminants measurements were made at the top of every other column starting with the second column. COD measurements were made of the effluent from the last column. The amount of oxygen consumed in each column was varied by enriching with oxygen the air introduced into columns 2, 4, 6, 8 and 10.

EXAMPLE 1

In Example 1, air was introduced into the columns, in the manner described above, unenriched at one atmosphere. Thus, the total oxygen added to the waste water and consumed in all five columns, i.e. columns 2, 4, 6, 8 and 10, was 35 milligrams per liter. The effluent from the last column indicated a total COD removal of about 90% consistently during a period of 2 weeks that these conditions were maintained. During this 2-week period, the production of biological sludge was low, with no troublesome accumulation in any of the columns. Backwashing was required only about once every 4 days. After one week of operation, the presence of hydrogen sulfide was detected from both odor and chemical analysis in the effluent from the top of the lead column and was determined to be in the range from about 20 to about 50 parts per million hydrogen sulfide. After two weeks of operation, hydrogen sulfide was also detected in the effluent from the last column in an amount of about 2 parts per million.

EXAMPLE 2

In Example 2, oxgen was added to the activated carbon bed in the same manner as described in Example 1, except that the air was enriched to contain 60% oxygen concentration and the pressure in the columns was increased to 30 psig, resulting in a dissolved oxygen concentration of about 40 parts per million at the points of introduction into the waste water. The total COD removal as indicated by measurements on the effluent from the last column was in the range of about 90% during the 2-week period this run was conducted. Production of sludge was greatly accelerated, necessitating more frequent backwashing in order to prevent excessive fouling and expansion of the bed. The presence of hydrogen sulfide, however, could not be detected either by odor or chemical analysis from either the lead columns or the effluent from the last column during this run.

EXAMPLE 3

In Example 3, oxygen was introduced in the same manner as described in Examples 1 and 2. However, the concentration of the oxygen introduced was reduced to 35% at 20 psia such that the dissolved oxygen concentration at the injection points was about 12 parts per million and the total oxygen consumed was approximately 50 parts per million. Total COD removal remained at the 90% level during the seven-day period this run was conducted. In addition, no hydrogen sulfide was detected in either the lead columns or in the effluent from the last column. Furthermore, the volume of biological sludge produced during this seven-day period was significantly reduced. Air scouring of the carbon bed was employed during the backwashing operation in order to partially remove the sludge adhering to the carbon granules during the backwashing cycle.

EXAMPLE 4

In Example 4, the oxygen was introduced into the system in the same manner as described in Examples 1–3, unenriched air at a pressure of one atmosphere being introduced into the system such that the total oxygen added to the water and consumed in all the columns was about 35 milligrams per liter. During the 3-week period of this run, the average removal rate of the total COD was about 75%. During this period, the production of biological sludge was low and backwashing was required only about every six days. The evolution of hydrogen sulfide, however, was not controlled and was unsatisfactory since hydrogen sulfide was detected in the effluent in concentrations ranging from about 4 to 50 parts per million after three weeks of operation.

EXAMPLE 5

In Example 5, oxygen was again introduced in essentially the same manner as described for the previous Examples 1–4, the oxygen being introduced as unenriched air at slightly elevated pressure so as to oxygenate the waste water passing through the carbon columns. The average total COD removal during this run was about 90%. Backwashing was performed about every 2 days and included the air scouring technique. Throughout this run, the formation of biological sludge was not excessive and there was no noticeable hydrogen sulfide present in the lead columns or in the effluent from the last column.

EXAMPLE 6

In Example 6, the activated fluid coke described previously was employed as the activated carbon material. The refinery waste water which was treated had an average COD concentration of 700 milligrams per liter. The waste water was passed continuously at a rate of about 1.5 gallons per minute per square foot sequentially up through six columns 2 inches in diameter and containing 2 feet of settled bed depth of activated fluid coke. Oxygen was introduced into the system by introducing the gaseous stream containing oxygen into the waste water in the same manner as described for Example 1 above. Air was employed to oxygenate the waste water in the same manner as described for the previous examples, the waste water being saturated with oxygen in equilibrium with air at a pressure which varied from atmospheric to 30 psig in the manner similar to that described for commercial activated carbon in Example 1. During the 4-week period of this run, an average of 50 milligrams per liter of oxygen was added to the waste water and consumed in all the columns. The average total COD removal with this system was approximately 80%. The air scouring technique was employed during the backwashing operation in order to partially remove the biological growth which accumulated on the activated fluid coke. During the 4-week period of this run, there was no evidence of evolution of hydrogen sulfide in the effluent from the last column at any time during the run. Furthermore, the biological sludge prevention was within acceptable limits in that excessive accumulation in the bed(s) did not occur.

In the following Examples 7–8, a refinery waste water stream was treated as shown in FIG. 1. The waste water was first passed through a dual-media, anthracite and sand, filter for pretreatment to remove suspended material as previously described. The pretreated waste water was then passed into a storage tank and thereafter into a presaturation zone. The effluent from the presaturation zone passed continually and sequentially through two activated carbon contacting zones 18 inches in diameter and 40 feet high, each zone containing 20 feet of commercially activated granular carbon in the lower half of said zone. Oxygen was added to the activated carbon bed as described hereinafter. Dissolved oxygen concentrations were calculated based on the waste water being 100% saturated at the measured temperature and pressure of the water leaving each zone in which oxygen is dissolved in the water, e.g. presaturation zone and freeboard. The dissolved oxygen concentrations in the effluent leaving each activated carbon bed were measured by means of a polarographic oxygen analyzer (see the reference *Standard Methods for the Examination of Water and Waste Water* cited supra). COD measurements were made of the effluent from the second and last activated carbon contacting zone. COD concentrations of the effluent from the first activated carbon contacting zone were calculated from Total Organic Carbon (TOC) measurements (see the *Standard Methods for the Examination of Water and Waste Water*) and established COD/TOC ratios for the particular waste water.

EXAMPLE 7

In Example 7, a refinery waste water stream having a COD contaminant level ranging from about 850–1900 milligrams per liter is filtered, thereby providing a filtrate having a COD ranging from about 600 to 1000 milligrams per liter. The filtrate was passed continuously at a rate of about 3 gallons per minute per square foot into the top of a presaturation zone. Oxygen was added to the bottom of the presaturation zone, flowed upward countercurrent to the waste water and dissolved therein, substantially saturating the waste water stream. Waste water containing dissolved oxygen was then passed upward through the first activated carbon contacting zone. Oxygen was again introduced into the freeboard of the contacting zone and passed upward while being dissolved in the waste water. The waste water then passed from the first contacting zone upward through the second activated carbon contacting zone and was discharged therefrom. This unit was operated for 29 days at inlet pressures to the first contacting zone of between about 30 and 60 psia. During this period, the two-stage activated carbon zone system was operated in a cyclic manner. Each 6 or 7 days the carbon in the first contacting zone was removed for regeneration. The carbon in the second contacting zone was transferred to the first zone, and fresh regenerated carbon was charged to said second zone. During this period, the average amount of COD removed from the waste water was about 666 milligrams per liter, and the average total amount of oxygen added to the system in both the presaturation zone and the freeboard of the first contacting zone was equivalent to about 37 milligrams per liter. This resulted in an average oxygen to COD ratio of 0.055 pound of oxygen consumed per pound of total COD removed. During this period, backwashing was performed on the second contacting zone each time that regenerated carbon was added during the cyclic operation (a total of 5 times or about once a week). In addition, the first stage contacting zone was air scoured and backwashed once during the 29 day operation. Hydrogen sulfide was not present in the effluent during this period, nor did excessive biological sludge production occur.

EXAMPLE 8

Another series of experiments similar to those described in Example 7 were conducted for a period of 14 days on a waste water having a COD contaminant level ranging from abut 800 to 1100 milligrams per liter. After filtration, the COD level ranged from about 600 to 700 milligrams per liter. Oxygen was introduced as in Example 7, except that the pressure at the inlet to first contacting zone ranged from about 46 to 60 psia. During the period of this run, air scouring and backwashing were done 7 times during the operation and once on regenerated carbon before cycling contacting zones. The average COD removal from the waste water was about 490 milligrams per liter, and the average total amount of oxygen added to the system was equivalent to 47 milligrams per liter. The average oxygen to COD ratio during this period was 0.096 pound of oxygen consumed per pound of total COD removed. This amount of oxygen addition prevented both sulfide evolution and excessive biological sludge production.

EXAMPLE 9

Another experiment was carried out in which, referring to FIG. 1, the filtered waste water from feed pump 6 was passed into the bottom of presaturation zone 7 while oxygen was introduced through line 9. The oxygen passed upward and was dissolved in the cocurrently flowing waste water, the excess oxygen being discharged through vent 10. Waste water containing dissolved oxygen was discharged from the top of drum 7 and passed sequentially upward (as in Examples 7 and 8) through contacting zones 12 and 16. The system operated under gravity flow conditions; that is, water flowed from drum 7 to zone 12 to zone 16 by gravity. In this experiment, pure oxygen was also injected directly into the bottom of each contacting zone through lines not shown in FIG. 1. The oxygen then passed upward through each bed and was vented through lines 14 and 19. This operation was continued for a period of 22 days, during which the average amount of COD removal was 517 milligrams per liter. The total amount of oxygen added to this system by being dissolved in the presaturation zone and by being injected directly into the bottom of each bed as equivalent to 315 milligrams per liter of waste water. The ratio of oxygen added to COD removed was 0.61 pound of oxygen added per pound of total COD removed. Operation during this period was not satisfactory due to excessive biological sludge production. Some of this sludge, along with some activated carbon from the contacting zones, was present in the effluent, causing turbidity and high levels of suspended solids. While the evolution of hydrogen sulfide was suppressed during this period, the overall performance was not satisfactory for the above reasons.

A summary of the operating conditions employed in the above-described examples as well as the overall results is presented in Table I.

TABLE I

Summary of Operating Conditions and Results for Examples 1 – 9

| Run No. | 1 | 2 | 3 | 4 | 5 | 6 | 7 | 8 | 9 |
|---|---|---|---|---|---|---|---|---|---|
| Aerating Gas | Air | 60%-$O_2$ | 35%-$O_2$ | Air | Air | Air | 99%-$O_2$ | 99%-$O_2$ | 99%-$O_2$ |
| mg./l. total COD removed | 410 | 700 | 630 | 450 | 390 | 560 | 666 | 490 | 520 |
| mg. $O_2$ added/l | 35 | 110 | 50 | 35 | 45 | 50 | 37 | 47 | 315 |
| lb. $O_2$ consumed/lb. total COD removed | .085 | .157 | .080 | .078 | .120 | .090 | 0.055 | 0.096 | 0.61(1) |
| Backwashing including air scouring | No | No | Yes | No | Yes | Yes | No | Yes | No |
| Sulfide evolution completely suppressed | No | Yes | Yes | No | Yes | Yes | Yes | Yes | Yes |
| Acceptable sludge production | Yes | No | Yes | Yes | Yes | Yes | Yes | Yes | No |
| Favorable overall results | No | No | Yes | No | Yes | Yes | Yes | Yes | No |
| No. of Stages | 12 | 12 | 12 | 12 | 12 | 6 | 2 | 2 | 2 |

(1)Represents lb. of $O_2$ added/lb. total COD removed.

As can be seen from the results as shown in Table I, the amount of oxygen added per pound of total COD removed is critical in order to control the aerobic/anaerobic biological oxidation of the contaminants adsorbed on the activated carbon so as to prevent an excessive sludge production resulting in plugging of the bed while at the same time suppressing the evolution of hydrogen sulfide. With respect to the embodiment wherein an oxygen-containing gas is dissolved in the waste water stream at the freeboard of the activated carbon bed(s), Runs 1, 2 and 4 clearly indicate that when the amount of oxygen added to the beds is in the range of from about 0.09 to about 0.15 pound of oxygen per pound of total COD removed, the evolution of hydrogen sulfide from the bed is suppressed and the production of biological sludge on the activated carbon material is minimized. However, the oxygen added may range as low as 0.05 pound of oxygen per pound of total COD removed. In addition, it can be seen that when air scouring is employed during the backwashing technique as exemplified by Runs 3, 5 and 6, the amount of oxygen per pound of total COD removed may be reduced in order to obtain the advantages noted above.

Runs 7 and 8 relate to the preferred embodiment of the present invention wherein oxygen is dissolved in the waste water stream in a presaturation zone so as to substantially saturate said waste water prior to contact with the first bed of activated carbon. Both runs clearly indicate that acceptable production of sludge and hydrogen sulfide can be achieved when the amount of oxygen consumed per pound of total COD removed ranges between about 0.05 and 0.10. However, as mentioned above, this particular embodiment may be suitably operated over the broad range of the present invention, i.e., from about 0.05 to about 0.15 pound of oxygen consumed per pound of total COD contaminants removed, or to even lower levels of oxygen addition. In addition, acceptable production of hydrogen sulfide and sludge is obtained with less oxygen addition. Further, Run 7, is accomplished with minimal backwashing. Run 9 shows the results obtained when oxygen is injected directly into the bed(s) of activated carbon.

What is claimed is:

1. In a process for removing suspended solids and dissolved organic contaminants from waste water having a COD of from about 100 to 2000 milligrams per liter and derived from the group consisting of petroleum refining, chemical manufacturing waste or mixtures thereof, wherein the waste water is pretreated to remove suspended solids therefrom and thereafter contacted with at least one bed of activated carbon to remove dissolved organic contaminants from the pretreated waste water, the improvement which comprises suppressing the evolution of hydrogen sulfide from the bed of activated carbon and minimizing the production of sludge in the bed due to biological oxidation by dissolving oxygen in the waste water in an amount in the range of from about 0.09 to about 0.15 pound of oxygen consumed per pound of total COD contaminants removed from the waste water in said bed of activated carbon prior to said waste water contacting at least one bed of activated carbon.

2. The process of claim 1 wherein the activated carbon is activated fluid coke having a total surface area of at least 400 m$^2$/gm and a pore volume of at least 0.20 cc/gm, said activated fluid coke being prepared by contacting fluid coke with a gaseous mixture containing steam at a temperature of at least about 1500° F. for a period of time sufficient to convert at least 35 wt. % of the fluid coke to gaseous products.

3. The process of claim 2 wherein at least a portion of the oxygen is dissolved in the freeboard of each contacting zone.

4. The process of claim 1 wherein the pretreated waste water is passed upwardly through the bed of activated carbon.

5. The process of claim 4 wherein the activated carbon bed is periodically backwashed by passing water upwardly through the bed of activated carbon to reduce the amount of biological growth accumulated in said bed.

6. The process of claim 5 wherein the activated carbon is activated fluid coke having a total surface area of at least 400 m$^2$/gm and a pore volume of at least 0.20 cc/gm, said activated fluid coke being prepared by contacting fluid coke with a gaseous mixture containing steam of a temperature of at least 1500° F. for a period of time sufficient to convert at least 35 wt. % of the fluid coke to gaseous products.

7. The process of claim 5 wherein backwashing is interrupted intermittently in order to contact the activated carbon with a gaseous stream containing oxygen.

8. The process of claim 1 wherein at least a portion of the oxygen is dissolved in the waste water prior to contacting the first bed of activated carbon.

9. In a process for removing suspended solids and dissolved organic contaminants from waste water having a COD of from about 100 to 2000 milligrams per liter and derived from the group consisting of petroleum refining, chemical manufacturing waste water or mixtures thereof, wherein the waste water is passed initially through a primary treating zone to remove suspended solids and thereafter passing upwardly through at least one contacting zone containing a bed of activated carbon to remove dissolved organic contaminants, said bed of activated carbon being backwashed periodically by passing water upwardly through the bed at a sufficient velocity to reduce accumulated biological growth from the activated carbon, the improvement which comprises suppressing the evolution of hydrogen sulfide from said bed of activated carbon and minimizing the production of sludge in said bed due to biological oxidation by dissolving, in a presaturation zone, at least a portion of oxygen in the waste water in an amount in the range of from about 0.03 to about 0.15 pound of oxygen consumed per pound of total COD contaminants removed from the waste water such that said waste water is substantially saturated with oxygen prior to contacting at least one bed of activated carbon, the remaining portion of the oxygen being added to the freeboard of at least one contacting zone.

10. The process of claim 9 wherein the amount of oxygen in the waste water is in the range of from about 0.05 to about 0.15 pound of oxygen consumed per pound of total COD contaminants removed from the waste water.

11. The process of claim 9 wherein at least a portion of the oxygen is added to the freeboard of each contacting zone.

12. The process of claim 9 wherein the activated carbon is activated fluid coke having a total surface area of at least 400 m$^2$/gm and a pore volume of at least 0.20 cc/gm, said activated fluid coke being prepared by contacting fluid coke with a gaseous mixture containing steam at a temperature of at least about 1500° F for a period of time sufficient to convert at least 35 wt. % of the fluid coke to gaseous products.

13. The process of claim 9 wherein backwashing is interrupted intermittently in order to contact the activated carbon with a gaseous stream containing oxygen.

14. The process of claim 9 wherein the waste water is substantially saturated with oxygen prior to contacting the first bed of activated carbon.

15. The process of claim 9 wherein the waste water from the primary treating zone is passed upwardly through at least two contacting zones.

16. The process of claim 9 wherein the amount of oxygen consumed per pound of total COD contaminants removed from the waste water ranges between about 0.05 and 0.10.

17. The process of claim 16 wherein the waste water from the primary treating zone is passed upwardly through at least two contacting zones.

18. The process of claim 17 wherein in the waste water is substantially saturated with oxygen prior to contacting the first bed of activated carbon.

19. In a process for removing suspended solids and dissolved organic contaminants from waste water having a COD of from about 100 to 2000 milligrams per liter and derived from the group consisting of petroleum refining, chemical manufacturing waste water or mixtures thereof, wherein the waste water is initially passed through a primary treating zone to remove suspended solids therefrom and thereafter contacted with at least one bed of activated carbon to remove dissolved organic contaminants from the pretreated waste water, the improvement which comprises suppressing the evolution of hydrogen sulfide from the bed of activated carbon and minimizing the production of sludge in said bed due to biological oxidation by dissolving, in a presaturation zone, at least a portion of oxygen in the waste water in an amount in the range from about 0.03 to about 0.15 pound of oxygen consumed per pound of total COD contaminants removed from the waste water such that said waste water is substantially saturated with oxygen prior to contacting at least one bed of activated carbon, the remaining portion of the oxygen being added to the freeboard of at least one contacting zone.

20. The process of claim 19 wherein the amount of oxygen consumed per pound of total COD contaminants removed from the waste water ranges between about 0.05 and 0.15.

21. The process of claim 19 wherein the waste water from the primary treating zone is passed upwardly through at least two contacting zones.

22. The process of claim 19 wherein the amount of oxygen consumed per pound of total COD contaminants removed from the waste ranges between about 0.05 and 0.10.

23. The process of claim 22 wherein the waste water from the primary treating zone is passed upwardly through at least two contacting zones.

24. The process of claim 22 wherein the water is substantially saturated with oxygen prior to contacting the first bed of activated carbon.

25. The process of claim 19 wherein at least a portion of the oxygen is added to the freeboard of each contacting zone.

26. The process of claim 19 wherein the activated carbon is activated fluid coke having a total surface area of at least 400 $m^2/gm$ and a pore volume of at least 0.20 cc/gm, said activated fluid coke being prepared by contacting fluid coke with a gaseous mixture containing steam at a temperature of at least 1500° F. for a period of time sufficient to convert at least 35 wt. % of the fluid coke to gaseous products.

27. The process of claim 19 wherein the waste water is substantially saturated with oxygen prior to contacting the first bed of activated carbon.

* * * * *